United States Patent [19]

Nishimura et al.

[11] Patent Number: 4,970,388

[45] Date of Patent: Nov. 13, 1990

[54] ENCODER WITH DIFFRACTION GRATING AND MULTIPLY DIFFRACTED LIGHT

[75] Inventors: Tetsuharu Nishimura, Kawasaki; Satoshi Ishii, Tokyo; Yoichi Kubota, Kawasaki; Koh Ishizuka, Urawa; Masaaki Tsukiji, Tokyo, all of Japan

[73] Assignee: Canon Kabushiki Kaisha, Tokyo, Japan

[21] Appl. No.: 410,509

[22] Filed: Sep. 21, 1989

[30] Foreign Application Priority Data

Sep. 22, 1988 [JP] Japan .................................. 63-237965

[51] Int. Cl.$^5$ ............................................... H01J 3/14
[52] U.S. Cl. ............................. 250/237 G; 250/231.16
[58] Field of Search ......... 250/237 G, 231.14, 231.16; 356/374, 356

[56] References Cited

U.S. PATENT DOCUMENTS 4,629,886 12/1986 Akiyama et al. ............... 250/237 G
4,792,678 12/1988 Spies ..................................... 356/374
4,829,342 5/1989 Nishimura ....................... 250/231.16
4,868,385 9/1989 Nishimura ....................... 250/231.16
4,912,320 3/1990 Ishii et al. ....................... 250/231.13

*Primary Examiner*—David C. Nelms
*Attorney, Agent, or Firm*—Fitzpatrick, Cella, Harper & Scinto

[57] ABSTRACT

An encoder for measuring the displacement of a movable diffraction grating has means for applying a radiation beam to the diffraction grating, a reflecting optical system for causing first and second reflected and diffracted beams created on the diffraction grating by the application of the radiation beam to be reflected and diffracted at least twice by the diffraction grating, and means for receiving an interference beam formed by the first and second reflected and diffracted beams reflected and diffracted at least twice and converting it into a signal conforming to the displacement of the diffraction grating.

30 Claims, 5 Drawing Sheets

ENCODER WITH DIFFRACTION GRATING AND MULTIPLY DIFFRACTED LIGHT

BACKGROUND OF THE INVENTION

1. Field of the Invention

This invention relates to an encoder, and more particularly to an encoder in which a radiation beam is applied to a diffraction grating formed on a scale and diffracted beams created by said diffraction grating are superposed one upon other to thereby form an interference beam and the interference beam is converted into a signal to thereby measure a displacement of the scale.

2. Related Background Art

In recent years, in precision machines such as NC machine tools and semiconductor printing apparatuses, there has been required a precise measuring device which can measure the displacement of a movable stage or the like in the unit of 1 $\mu$m or less (submicron). As a measuring device which can measure the displacement of a movable body in the unit of submicron, there is known a high resolving power encoder in which a radiation beam from a coherent beam source such as a laser is applied to the diffraction grating of a scale mounted on the movable body and an interference beam is formed from diffracted lights from the scale and the interference beam is converted into an electrical signal to thereby measure the displacement of the movable body.

An example of the encoder of this type is shown in FIG. 1 of the accompanying drawings. In FIG. 1, the reference numeral 1 designates a laser, the reference numeral 2 denotes a collimator lens, and the reference numeral 3 designates a diffraction grating of grating pitch d mounted on a moving body, not shown, and moving at a velocity v, for example, in the direction of arrow A. The reference numerals 51 and 52 denote quarter wavelength plates, the reference numerals 41 and 42 designate dachprisms or corner cube reflecting mirrors for preventing any variation in the oscillation wavelength of the laser 1 and the axial deviation of rediffracted light caused by the inclination of the diffraction grating 3, the reference numeral 6 denotes a beam splitter, and the reference numerals 71 and 72 designate polarizing plates having their axes of polarization orthogonal to each other and disposed so as to form an angle of 45° with respect to the axes of polarization of the quarter wavelength plates 51 and 52. The reference numerals 81 and 82 denote light receiving elements.

In FIG. 1, the light beam from the laser 1 is substantially collimated by the collimator lens 2 and enters the diffraction grating 3 perpendicularly thereto. Positive and negative 1st-order diffracted lights diffracted by the diffraction grating 3 are reflected by the corner cube reflecting mirrors 41 and 42 through the quarter wavelength plates 51 and 52 and again enter the diffraction grating, and again become positive and negative 1st-order diffracted lights and emerge from the diffraction grating 3 and overlap each other, and are divided into two light beams by the beam splitter 6, and the two light beams enter the light receiving elements 81 and 82, respectively, through the polarizing plates 71 and 72.

Here, the interference lights entering the light receiving elements 81 and 82 are given a phase difference of 90° therebetween by a combination of the quarter wavelength plates 51, 52 and the polarizing plates 71, 72, and the two signals from the light receiving elements 81 and 82 are used for the discrimination of the direction of movement of the diffraction grating 3. The pulse of a signal produced by a variation in the light and darkness of the interference lights from the light receiving elements 81 and 82 is counted to thereby find the amount of movement of the diffraction grating 3.

In the encoder shown in FIG. 1, ±1st-order rediffracted lights are used and therefore, a sine wave signal (pulse) of a period of ¼ m of the grating pitch P of the diffraction grating 3 is obtained from the light receiving elements 81 and 82. For example if the grating pitch of the diffraction grating 3 is 1.6 $\mu$m, a sine wave signal of a period of 0.4 $\mu$m which is ¼ of the grating pitch is obtained from the light receiving elements 81 and 82. If an attempt is made to obtain, for example, an output pulse of interval 5 nm from this sine wave signal, it becomes necessary to electrically divide this sine wave signal into eighty by an electrical dividing circuit subsequent to the light receiving elements 81 and 82. Generally, electrical division tends to reduce the measurement accuracy and high division is difficult. For this reason, a higher resolving power of the outputs themselves of the light receiving elements of the encoder is required.

In answer to this requirement, the applicant has disclosed in U.S. Application Ser. No. 190,247 an encoder for forming an interference beam by diffracted beams diffracted three or more times by a diffraction grating. In this encoder, the number of electrical divisions is decreased and measurement of high accuracy and moreover high resolving power can be accomplished.

SUMMARY OF THE INVENTION

This invention intends to improve the encoder shown in the aforementioned U.S. application and provide an encoder made compact.

To achieve this object, the encoder of the present invention is characterized by means for applying a radiation beam to a movable diffraction grating, a reflecting optical system for causing first and second reflected and diffracted beams created by said diffraction grating to be reflected and diffracted by said diffraction grating at least twice, and means for receiving an interference beam formed by said first and second diffracted beams reflected and diffracted at least twice and converting it into a signal conforming to the displacement of said diffraction grating.

In a certain form of the present invention, the beam paths of said first and second reflected and diffracted beams are partly made common to each other, whereby the reflecting optical system is made compact and the occurrence of a measurement error resulting from a change in the ambient temperature of the optical system is suppressed. Also, said reflecting optical system is constructed so that the first and second reflected and diffracted beams may pass through only two different portions of said diffraction grating, thereby making the encoder compact.

Further features and specific forms of the present invention will be described in detail in the following description of some embodiments of the present invention.

DESCRIPTION OF THE PREFERRED EMBODIMENTS

Figure 2:
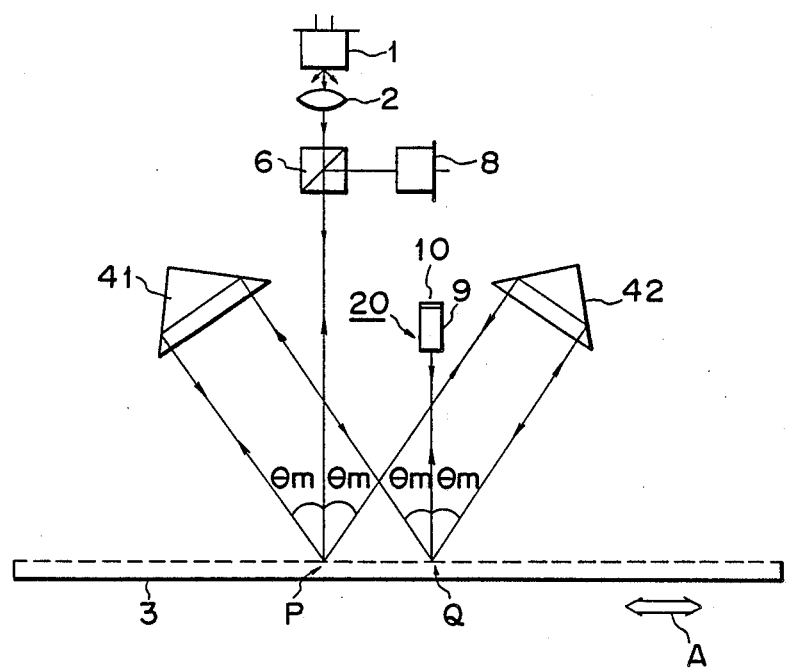
FIG. 2 is a schematic view showing an embodiment of the encoder of the present invention.

Referring to FIG. 2 which is a schematic view showing an embodiment of the present invention, the reference numeral 1 designates a multimode semiconductor laser, the reference numeral 2 denotes a collimator lens, and the reference numeral 3 designates a phase type diffraction grating (scale) of grating pitch d mounted on a moving body, not shown, and moving at a velocity v in the direction of arrow A.

The reference numerals 41 and 42 denote corner cube reflecting mirrors (roof prisms), the reference numeral 6 designates a beam splitter (half-mirror), and the reference numeral 8 denotes a light receiving element. The reference numeral 9 designates an index gradient type lens of the end surface imaging type. A reflecting film 10 is deposited by evaporation on one end surface of this lens whose opposite ends each comprise a planar surface, and constitutes a reflecting surface. The index gradient type lens 9 and the reflecting film 10 together constitute an optical system 20.

In FIG. 2, the laser beam from the laser 1 is substantially collimated by the collimator lens 2, is transmitted through the beam splitter 6 and effects first incidence on a point P on the diffraction grating 3 perpendicularly thereto. The light beam incident on the diffraction grating 3 perpendicularly thereto is reflected and diffracted by the diffraction grating 3, and from the diffraction grating 3, +1st-order diffracted light (a first reflected and diffracted light) and −1st-order diffracted light (a second reflected and diffracted light) emerge in directions forming an angle $\theta$ with respect to the perpendicular to the diffraction grating 3. In the present embodiment, the light emerging rightwardly obliquely upwardly from the diffraction grating 3 is called +1st-order diffracted light, and the light emerging leftwardly obliquely upwardly from the diffraction grating 3 is called −1st-order diffracted light. Now, the +1st-order diffracted light enters the reflecting mirror 42, and is reflected by the reflecting mirror 42 so as to travel along an optical path substantially parallel to the optical path along which it has entered the reflecting mirror 42, and enters a point Q on the diffraction grating 3 from the right above it at an angle of incidence $\theta m$. On the other hand, the −1st-order diffracted light enters the reflecting mirror 41, and is reflected by the reflecting mirror 41 so as to travel along an optical path substantially parallel to the optical path along which it has entered the reflecting mirror 41, and enters the point Q on the diffraction grating 3 from the left above it at an angle of incidence $\theta m$. At the point Q, +1st-order diffracted light created by the +1st-order diffracted light being reflected and diffracted and −1st-order diffracted light created by the −1st-order diffracted light being reflected and diffracted emerge from the diffraction grating 3 perpendicularly thereto in a mutually overlapping state, and enter the optical system 20. The optical system 20 comprises the index gradient type lens 9 and the reflecting film 10, and the opposite end surfaces the lens 9 are planar surfaces as shown, and the reflecting film 10 is deposited by evaporation on one of these end surfaces. The position of this reflecting film 10 is the focus position of the optical system 20. Accordingly, since the ±1st-order diffracted lights are parallel lights, the ±1st-order diffracted lights which have entered the optical system 20 are focused on the reflecting film 10 by the lens 9 and reflected by the reflecting film 10. The ±1st-order diffracted lights then emerge from the optical system 20 so as to travel along the same optical paths as the optical paths along which they have entered the optical system 20, and effect third incidence on the point Q on the diffraction grating 3.

+1st-order diffracted light created by the +1st-order diffracted light being reflected and diffracted at the point Q emerges from the diffraction grating 3 in a direction forming an angle $\theta m$ with respect to the perpendicular to the diffraction grating 3 (rightwardly obliquely upwardly) and travels toward the reflecting mirror 42. On the other hand, −1st-order diffracted created by the −1st-order diffracted light being reflected and diffracted at the point Q emerges from the diffraction grating 3 in a direction forming an angle $\theta m$ with respect to the perpendicular to the diffraction grating 3 (leftwardly obliquely upwardly) and travels toward the reflecting mirror 41. The +1st-order diffracted light is reflected by the reflecting mirror 42 so as to travel along an optical path substantially parallel to the optical path along which it has entered the reflecting mirror 42, and effects the fourth incidence on the point P on the diffraction grating from the right obliquely above it at an angle of incidence $\theta m$. +1st-order diffracted light created by this +1st-order diffracted light being reflected and diffracted at the point P emerges from the diffraction grating 3 perpendicularly thereto. Also, the −1st-order diffracted light is reflected by the reflecting mirror 41 so as to travel along an optical path substantially parallel to the optical path along which it has entered the reflecting mirror 41, and effects the fourth incidence on the point P on the diffraction grating 3 from the left obliquely above it at an angle of incidence $\theta m$. −1st-order diffracted light created by this −1st-order diffracted light being reflected and diffracted at the point P emerges from the diffraction grating 3 perpendicularly thereto. Thus, the ±1st-order diffracted lights diffracted four times by the diffraction grating 3 emerge in overlapping relationship with each other. Here, the ±1st-order diffracted lights are reflected by the beam splitter 6 and enter the light receiving element 8 as an interference light. The light receiving element 8 photoelectrically converts the interference light and outputs an electrical signal indicative of the displacement of the diffraction grating 3.

Figure 1:
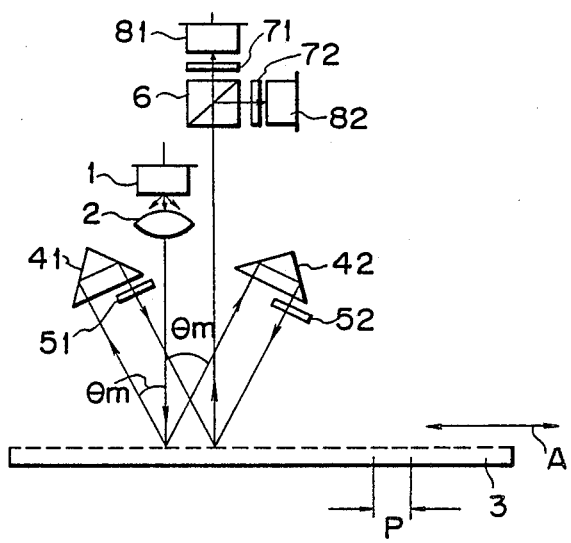
FIG. 1 is a schematic view showing an example of the encoder according to the prior art.

In the present embodiment, the light receiving element 8 receives the interference light resulting from the interference between the lights each subjected to first-order reflection and diffraction four times. Then the light receiving element 8 detects any variation in the light and darkness of the interference light caused by the displacement of the diffraction grating 3, whereby any change in the diffraction grating 3 is measured. Here, if the diffraction grating 3 is displaced by one pitch P, the variation in the light and darkness of the interference light is repeated 4×2=8 times. That is, a sine wave signal of a period P/8 m is output from the light receiving element 8. For example, assuming that the pitch of the diffraction grating 3 is 1.6 $\mu m$, a sine wave signal of a period 0.2 μm is output from the light receiving element 8. This means that as compared with the prior-art encoder shown in FIG. 1, double resolving power has been obtained. That is, the number of divisions of the subsequent electrical dividing circuit for obtaining an output pulse of interval 5 nm may be forty.

The optical system 20 in the present embodiment is such that the reflecting surface having the reflecting film 10 applied thereto is disposed near the focal plane of the lens 9 and therefore, even if with a change in the oscillation wavelength of the laser light, the angle of diffraction changes minutely and the angle of incidence of the diffracted lights onto the optical system 20 changes, the diffracted lights can be returned along substantially the same optical path. Thereby the two diffracted lights are made to overlap each other accurately, thus preventing a reduction in the S/N ratio of the output signal of the light receiving element.

Figure 3:
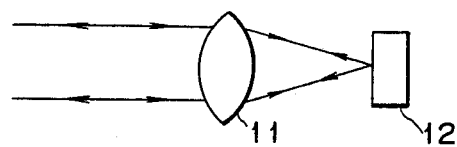
FIG. 3 is a schematic view showing a modification of the optical system 20 shown in FIG. 2.

While in the present embodiment, the index gradient type lens 9 having the reflecting film 10 applied to one end surface thereof is employed as the optical system 20, the optical system 20 may also be constituted by a combination of a condensing lens 11 and a reflecting mirror 12 as shown, for example, in FIG. 3.

Since in the present embodiment, the light beam is reflected and diffracted four times by the diffraction grating 3, it is preferable to design the diffraction grating 3 such that the diffraction efficiency of the diffraction grating 3 for the 1st-order reflected and diffracted light becomes as high as possible.

Figure 4A:
FIGS. 4A and 4B are schematic views showing examples of the construction of the diffraction grating 3 shown in FIG. 2.
Figure 4B:
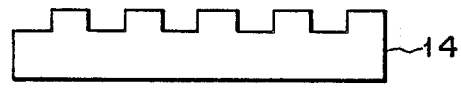

For this reason, a phase type grating such as an echelette grating 13 shown in FIG. 4A or a lamellar grating 14 shown in FIG. 4B is used as the diffraction grating 3.

In the present embodiment, the ±1st-order diffracted lights having emerged from the point P are further reflected and diffracted three times by the reflecting optical system 20, 41, 42, but alternatively, the reflecting optical system may be designed to reflect and diffract the ±1st-order diffracted lights twice or four or more times. Also, the order of the diffracted lights forming the interference light is not limited to the 1st-order as in the present embodiment. Accordingly, the reflecting optical system may be designed so as to form an interference light by ±2nd-order or ±3rd-order diffracted lights.

Figure 5:
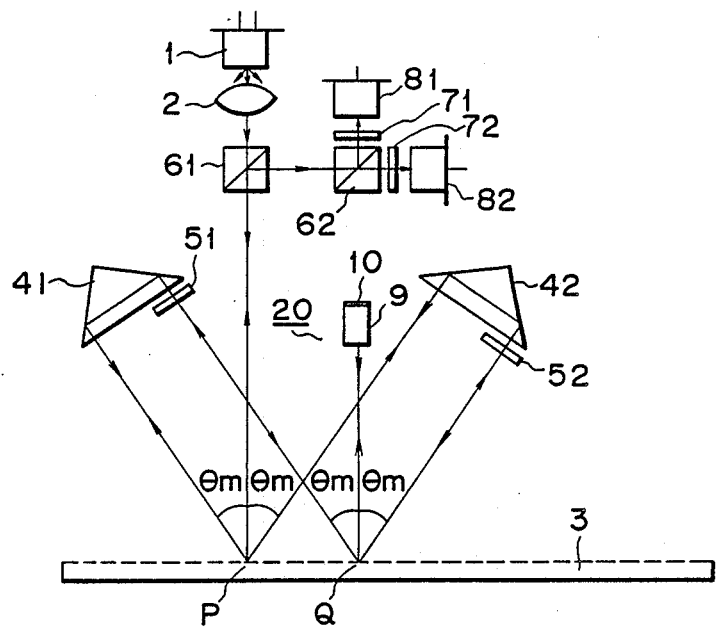
FIG. 5 is a schematic view showing a modification of the encoder shown in FIG. 2.

An embodiment shown in FIG. 5 is a partial improvement in the embodiment of FIG. 2 made so as to be capable of detecting the direction of movement of the diffraction grating 3 as well. In FIG. 5, the reference numerals 51 and 52 designate quarter wavelength plates, the reference numerals 71 and 72 denote polarizing plates, and the reference numerals 81 and 82 designate light receiving elements.

In the embodiment of FIG. 2, the light beam from the beam splitter 6 is directly received by the light receiving element 8, but in the present embodiment, as shown in FIG. 5, the light beam is divided into two light beams by a beam splitter 62 and the two light beams are received by the light receiving elements 81 and 82. Output signals obtained by the two light receiving elements 81 and 82 are given a phase difference of 90° by the utilization of the quarter wavelength plates 51, 52 and the polarizing plates 71, 72.

Thus, not only the amount of movement but also the direction of movement of the diffraction grating 3 can be discriminated.

Figure 6:
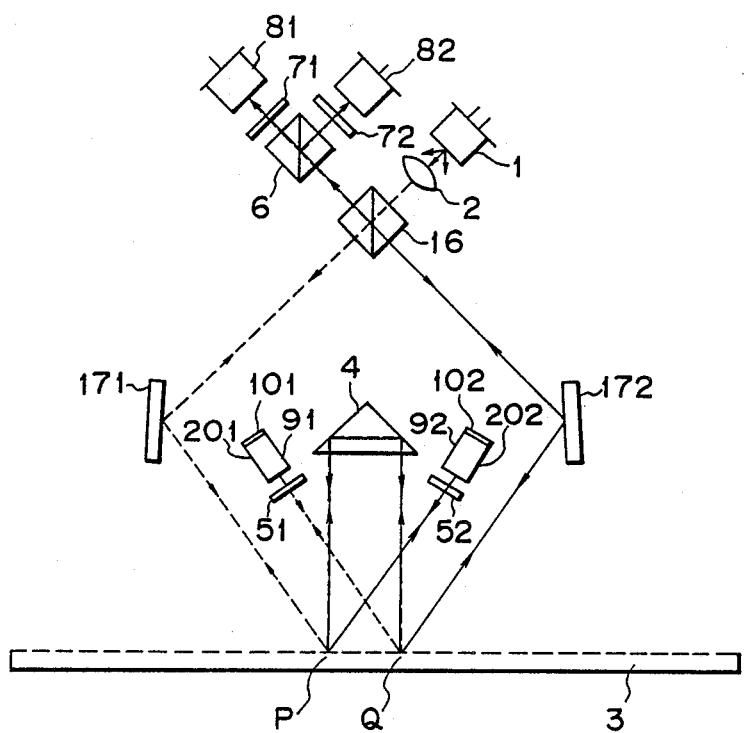
FIG. 6 is a schematic view showing another embodiment of the encoder of the present invention.

FIG. 6 is a schematic view showing another embodiment of the present invention.

In this embodiment, the light beam from the semiconductor laser 1 is divided into two light beams by the use of a polarizing beam splitter 16, whereafter the two light beams are caused to enter the diffraction grating 3 by mirrors 171 and 172, whereby the loss of the quantity of light is reduced as compared with the case of FIG. 5 which uses the beam splitter 61.

In FIG. 6, the optical path indicated by a solid line is the optical path of diffracted light subjected four times to the +1st-order diffraction created by the diffraction grating 3, and the optical path indicated by a broken line is the optical path of diffracted light subjected four times to the −1st-order diffraction created by the diffraction grating 3. The reference numerals 201 and 202 designate optical systems similar to the optical system 20 of FIG. 2, and the reference numeral 4 denotes a corner cube reflecting mirror.

Again in the present embodiment, as in the embodiment shown in FIG. 5, interference lights differing in phase from each other are received by the two light receiving elements 81 and 82 by the use of the quarter wavelength plates 51, 52 and the polarizing plates 71, 72, and the output signals of the light receiving elements 81 and 82 are given a phase difference of 90° therebetween so that the direction of movement of the diffraction grating can also be discriminated.

The laser light emitted from the multimode semiconductor laser 1 is collimated by the collimator lens 2, whereafter it is divided into two P-polarized and S-polarized light beams by the polarizing beam splitter 16. The S-polarized light reflected by the polarizing beam splitter 16 is incident on the point Q on the diffraction grating 3 from the right obliquely above it via the mirror 172, and is reflected and diffracted by the diffraction grating 3. On the other hand, the P-polarized light transmitted through the polarizing beam splitter 16 is incident on the point P on the diffraction grating 3 from the right obliquely above it via the mirror 171, and is reflected and diffracted by the diffraction grating 3. The then angle of incidence of each light onto the diffraction grating (the angle of inclination from the perpendicular to the diffraction grating 3) is set to equal to the angle of diffraction of the 1st-order diffracted light by the diffraction grating 3. Accordingly, +1st-order diffracted light comprising the S-polarized light diffracted at the point Q on the diffraction grating 3 and −1st-order diffracted light comprising the P-polarized light diffracted at the point P on the diffraction grating 3 emerge from the diffraction grating 3 perpendicularly thereto and travel toward the reflecting mirror 4.

The +1st-order diffracted light reflected by the reflecting mirror 4 is incident on the point P on the diffraction grating 3 perpendicularly thereto and is again reflected and diffracted by the diffraction grating 3. Of the ±1st-order reflected and diffracted lights created at this time, the +1st-order reflected and diffracted light travels toward the optical system 202 through the λ/4 plate 52, and is reflected by the optical system 202 and returned to the point P on the diffraction grating 3 again through the λ/4 plate 52. The +1st-order diffracted light created by being again reflected and diffracted by the diffraction grating 3 again enters the reflecting mirror 4 and is again directed to the diffraction grating 3 by the reflecting mirror 4, and is incident on the point Q on the diffraction grating 3 perpendicularly thereto. +1st-order diffracted light created by this +1st-order diffracted light being diffracted by the diffraction grating 3 travels toward the polarizing beam splitter 16 via the mirror 172. Here, this +1st-order diffracted light has passed through the λ/4 plate 52 twice and therefore becomes P-polarized light, and is transmitted through the polarizing beam splitter 16.

On the other hand, the −1st-order diffracted light reflected at first by the reflecting mirror 4 is incident on the point Q on the diffraction grating 3 perpendicularly thereto and is again reflected and diffracted by the diffraction grating 3. Of the ±1st-order reflected and diffracted lights created at this time, the −1st-order reflected and diffracted light travels toward the optical system 201 through the λ/4 plate 51 and is reflected by the optical system 201 and returned to the point Q on the diffraction grating 3 again through the λ/4 plate 51. The −1st-order diffracted light created by being again reflected and diffracted by the diffraction grating 3 again enters the reflecting mirror 4 and is again directed to the diffraction grating 3 by the reflecting mirror 4, and is incident on the point P on the diffraction grating 3 perpendicularly thereto. The −1st-order diffracted light created by the diffraction grating 3 at this time travels toward the polarizing beam splitter 16 via the mirror 171. This −1st-order diffracted light has passed through the λ/4 plate 51 twice and therefore becomes S-polarized light and is reflected by the polarizing beam splitter 16.

Thus, the ±1st-order reflected and diffracted lights subjected four times to diffraction by the diffraction grating 3 are made to overlap each other by the polarizing beam splitter 16. The light beam from the polarizing beam splitter 16 is divided into two light beams by the beam splitter 6, and the respective light beams are received as interference lights by the corresponding light receiving elements 81 and 82 through the corresponding polarizing plates 71 and 72. The light receiving elements 81 and 82 photoelectrically convert the interference lights incident thereon, and output an electrical signal indicative of the displacement of the diffraction grating 3.

The diffraction grating 3 in the present embodiment comprises a phase type diffraction grating, and has its depth d restricted so that O-order diffracted light may not be created. Specifically, it is formed so that $d = \lambda/4$, where λ is the oscillation wavelength of the semiconductor laser 1. Thereby, the energy of the incident light is sufficiently distributed to the ±1st-order diffracted lights to increase the measurement sensitivity.

The present embodiment is characterized in that ±1st-order diffracted lights share the single corner cube reflecting mirror 4.

Although in the above-described embodiments, description has been made of a linear encoder, the present invention can be equally applied to a rotary encoder.

We claim:

1. An encoder for measuring the displacement of a movable diffraction grating, comprising:
   means for directing a radiation beam to the diffraction grating;
   a reflecting optical system for causing first and second reflected and diffracted beams emitted from said diffraction grating to be reflected and diffracted at least twice by the diffraction grating; and
   a detector for detecting an interference beam formed by said first and second reflected and diffracted beams reflected and diffracted at least twice and converting said interference beam into a signal.

2. An encoder according to claim 1, wherein said reflecting optical system causes said first and second reflected and diffracted beams to be reflected and diffracted three times by the diffracted grating.

3. An encoder according to claim 2, wherein said directing means directs said radiation beam to enter a predetermined location on the diffraction grating substantially perpendicular to the diffraction grating so that said first and second reflected and diffracted beams are formed at said predetermined location.

4. An encoder according to claim 2, wherein said directing means directs first and second radiation beams to obliquely enter different locations on the diffraction grating so that said first and second reflected and diffracted beams are formed at different locations on the diffraction grating, said first reflected and diffracted beam being created by said first radiation beam being reflected and diffracted by the diffraction grating, said second reflected and diffracted beam being formed by said second radiation beam being reflected and diffracted by the diffraction grating.

5. An encoder according to claim 1, wherein said reflecting optical system causes said first and second reflected and diffracted beams to have a common optical path.

6. A encoder according to claim 1, wherein said reflecting optical system causes said first and second reflected and diffracted beams to pass through only two locations on the diffraction grating.

7. An encoder according to claim 1, wherein said first reflected and diffracted beam comprises a reflected and diffracted beam of a predetermined positive order and said second reflected and diffracted beam comprises a reflected and diffracted beam of said predetermined order but negative, wherein said first reflected and diffracted beam is converted into a reflected and diffracted beam of said predetermined positive order at each of the at least twice reflections and diffractions, by the diffraction grating and wherein said second reflected and diffracted beam is converted into a reflected and diffracted beam of said predetermined negative order at each of the at least twice reflections and diffractions by the diffraction grating.

8. An encoder according to claim 7, wherein said predetermined order is a first order.

9. An encoder according to claim 7, wherein said directing means comprises a semiconductor laser, and wherein said radiation beam is supplied by said semiconductor laser.

10. A method for measuring the displacement of a movable diffraction grating, comprising the steps of:
    directing a radiation beam to the diffraction grating so as to generate first and second reflected and diffracted beams from the diffraction grating;
    reflecting and diffracting said first and second reflected and diffracted beams at least twice at said diffraction grating;
    causing said first and second reflected and diffracted beams, which are reflected and diffracted at least twice, to interfere with each other so as to form an interference beam; and
    detecting said interference beam so as to measure the displacement of the diffraction grating.

11. A method according to claim 10, wherein said first reflected and diffracted beam comprises a positive reflected and diffracted beam and said second reflected and diffracted beam comprises a negative reflected and diffracted beam, and wherein said reflecting and diffracting step comprises the steps of converting said first reflected and diffracted beam into a positive reflected and diffracted beam at least twice, and converting said second reflected and diffracted beam into a negative reflected and diffracted beam at least twice.

12. A method according to claim 10, wherein said first reflected and diffracted beam comprises a +1-order reflected and diffracted beam, and said second reflected and diffracted beam comprises a −1-order reflected and diffracted beam, and wherein said reflecting and diffracting step comprises the steps of diffracting said first reflected and diffracted beam into a +1-order reflected and diffracted beam at least twice, and diffracting said second reflected and diffracted beam into a −1-order reflected and diffracted beam at least twice.

13. A method according to claim 10, wherein said reflecting and diffracting step comprises the steps of diffracting said first reflected and diffracted beam into a +1-order reflected and diffracted beam at least thrice, and diffracting said second reflected and diffracted beam into a −1-order reflected and diffracted beam at least thrice.

14. A method for measuring the displacement of a movable diffraction grating, comprising the steps of:
   directing a radiation beam to the diffraction grating so as to generate first and second reflected and diffracted beams from the diffraction grating;
   generating a first reflected and re-diffracted beam by directing said first reflected and diffracted beam into the diffraction grating and reflecting and diffracting the first reflected and diffracted beam directed into the diffraction grating, and generating a second reflected and re-diffracted beam by directing said second reflected and diffracted beam into the diffraction grating and reflecting and diffracting the second reflected and diffracted beam directed into the diffraction grating;
   forming a third reflected and diffracted beam by directing said first reflected and re-diffracted beam into the diffraction grating, and forming a fourth reflected and diffracted beam by direction said second reflected and rediffracted beam into the diffraction grating and reflecting and diffracting the second reflected and re-diffracted beam directed into the diffraction grating;
   causing said third and fourth reflected and diffracted beams to interfere with each other so as to form an interference beam; and
   detecting said interference beam so as to measure the displacement of the diffraction grating.

15. A method according to claim 14, wherein said first reflected and diffracted beam, said first reflected and re-diffracted beam and said third reflected and diffracted beam are respectively set as +1-order reflected and diffracted beams, and wherein said second reflected and diffracted beam, said second reflected and re-diffracted beam and said fourth reflected and diffracted beam are respectively set as −1-order reflected and diffracted beams.

16. An encoder for measuring the displacement of a movable diffraction grating, comprising:
   a light source;
   an optical system for directing a light beam from said light source substantially perpendicular to a predetermined first position on the diffraction grating, said optical system comprising:
   a lens system for converting said light beam from said light source to a collimated light beam; and
   a beam splitter provided in the light path of said collimated light beam, said collimated light beam being directed to said predetermined first position by means of said beam splitter;
   first reflecting means for reflecting an +m-order diffracted beam, generated by diffracting said collimated beam at said predetermined first position, so as to direct said +m-order diffracted beam into the diffraction grating at a second position different from said predetermined first position, said first reflecting means directing said +m-order diffracted beam to said second position along a light path parallel to that along which said +m-order diffracted beam travels to be reflected by said first reflecting means, m being a predetermined integer;
   second reflecting means for reflecting an −m-order diffracted beam generated by diffracting said collimated beam at said predetermined first position so as to direct said −m-order diffracted beam into the diffraction grating at said second position, said second reflecting means directing said −m-order diffracted beam to said second position along a light path parallel to that along which said −m-order diffracted beam travels to be reflected by said first reflecting means;
   third reflecting means for reflecting ±m-order re-diffracted beams, which are generated by diffracting said ±m-order diffracted beams sat said second position and emitting said ±m-order diffracted beams, diffracted at said second position, substantially perpendicularly from said diffraction grating, so as to direct said ±m-order re-diffracted beams into the diffraction grating at said second position substantially perpendicular to said diffraction grating, said +m-order re-diffracted beam being formed by said +m-order diffracted beam, said −m-order re-diffracted beam being formed by said +m-order diffracted beam, said −m-order re-diffracted beam being diffracted at said second position so as to direct said +m-order re-diffracted beam into the diffraction grating at said first position in a reverse direction from the direction in which said +m-order diffracted beam is directed into the diffraction grating at the second position and along the light path along which said +m-order diffracted beam is directed into the diffraction grating at said second position, said −m-order re-diffracted beam being diffracted at said second position so as to direct said −m-order re-diffracted beam into the diffraction grating at said first position in a reverse direction from the direction in which said −m-order diffracted beam is directed into the diffraction grating at said second position and along the light path along which said −m-order diffracted beam is directed into the diffraction grating at said second position; and
   detecting means for detecting first and second diffracted beams, which are generated by the diffraction grating diffracting said ±m-order re-diffracted beams at said first position so that said first and second diffracted beams are emitted substantially perpendicularly from the diffraction grating, by means of said beam splitter, said first diffracted light beam being formed by an +m-order diffracted beam from said +m-order re-diffracted beam and said second diffracted light beam being formed by an −m-order diffracted beam from said −m-order re-diffracted beam, and wherein said detecting means comprises a photoelectric converting means for converting an interference beam, generated by said first and second diffracted beams interfering with each other, into an electrical signal.

17. An encoder according to claim 16, wherein each of said first and second reflecting means comprises an element having a corner and said third reflecting means comprises an optical system including a lens and reflecting mirror.

18. An encoder according to claim 17, wherein said light source comprises a semiconductor laser and said lens system comprises a collimator lens.

19. An encoder according to claim 16, wherein said ±m-order diffracted beams, said ±m-order re-diffracted beams, and said first and second diffracted beams respectively comprise reflected beams.

20. An encoder according to claim 19, wherein m is 1.

21. An encoder for measuring the displacement of a movable diffraction grating, comprising:
a light source;
an optical system for directing a light beam from said light source to first and second spaced apart positions on said diffraction grating, said optical system comprising:
a lens system for collimating said light beam from said light source;
a beam splitter for dividing the collimated beam into first and second collimated beams; and
a mirror system for obliquely directing said first and second collimated beams respectively to said first and second positions;
first reflecting means for reflecting an +m-order diffracted beam generated by the diffraction grating diffracting said first collimated beam at said first position so as to direct said first collimated beam into the diffraction grating at said second position substantially perpendicularly thereto, and for reflecting an −m-order diffracted beam generated by the diffraction grating diffracting said second collimated beam at said second position so as to direct said second collimated beam into the diffraction grating at said first position substantially perpendicularly thereto, m being a predetermined integer;
second reflecting means for reflecting an +m-order re-diffracted beam generated by the diffraction grating diffracting said +m-order diffracted beam at said second position so as to direct said +m-order re-diffracted beam into the diffraction grating at said second position, said second reflecting means directing said +m-order re-diffracted beam to said second position in a reverse direction from the direction in which said +m-order-re-diffracted beam is directed to said second reflecting means and along the light path along which said +m-order re-diffracted beam enters into said second reflecting means, said +m-order re-diffracted beam being diffracted at said second position and directed into the diffraction grating at said first position substantially in a reverse direction from the direction in which said +m-order re-diffracted beam is directed to said to said second position and substantially along the light path along which said +m-order diffracted beam enters into said second position;
third reflecting means for reflecting a −m-order re-diffracted beam generated by the diffraction grating diffracting said −m-order diffracted beam at said first position so as to direct said −m-order re-diffracted beam into the diffraction grating at said first position, said third reflecting means directing said −m-order re-diffracted beam to said first position in a reverse direction and along the light path along which said −m-order re-diffracted beam is directed to said third reflecting means, said −m-order re-diffracted beam being diffracted at said first position and directed into the diffraction grating at said second position substantially in a reverse direction from the direction in which and along the light path along which said −m-order diffracted beam is directed to said first position; and
detecting means for detecting a first diffracted beam generated by the diffraction grating diffracting said +m-order re-diffracted beam at said first position and for detecting a second diffracted beam generated by the diffraction grating diffracting said −m-order re-diffracted beams at said second position by means of at least one of said reflecting means and by means of said beam splitter, said first diffracted beam being formed by an +m-order diffracted beam and said second diffracted beam being formed by an −m-order diffracted beam, said detecting means having a photoelectric converting means for converting an interference beam, generated by said first and second diffracted beams interfering with each other, to an electrical signal.

22. An encoder according to claim 21, wherein said first reflecting means comprises an element having a corner and said each of said and third reflecting mean comprises an optical system including a lens and a reflecting mirror.

23. An encoder according to claim 22, wherein said light source comprises a semiconductor laser and said lens system comprises a collimator lens.

24. An encoder according to claim 23, wherein said beam splitter comprises a polarizing beam splitter and each of said second and third reflecting means has a ¼λ plate.

25. An encoder according to claim 21, wherein said ±m-order diffracted beams, and said first and second diffracted beams respectively comprise reflected beams.

26. An encoder according to claim 25, wherein m is 1.

27. A method for measuring the displacement of a movable diffraction grating, comprising:
a step for irradiating a first position of the diffraction grating with a radiation beam;
a first diffracting step for respectively plurally diffracting first and second diffracted beams, which are generated at the first position in said irradiating step, at a second position on the diffraction grating spaced apart from the first position;
a second diffracting step for respectively diffracting a first re-diffracted beam generated from the first diffracted beam by said first diffracting step and diffracting a second re-diffracted beam generated from the second diffracted beam by said first diffracting step, at the first position;
a forming step for forming an interference beam by interfering a diffracted beam which is generated by diffracting said first re-diffracted beam at the first position and by diffracting the second re-diffracted beam at the first position; and a measuring step for measuring the displacement of the diffraction grating by detecting the interference beam.

28. A method according to claim 27, wherein the first diffracted beam comprises a +1-order diffracted beam and the second diffracted beam comprises a −1-order diffracted beam, and said first diffracting step comprises a step of plurally converting the first diffracted beam to a +1-order diffracted beam by diffraction and for plurally converting the second diffracted beam to a −1-order diffracted beam by diffraction, and wherein the first re-diffraction beam is generated as a +1-order diffracted beam and the second re-diffracted beam is generated as a −1-order diffracted beam by said converting steps, and the diffracted beam generated by diffracting the first re-diffracted beam comprises a +1-order diffracted beam and the diffracted beam generated by diffracting the second re-diffracted beam comprises a +1-order diffracted beam.

29. A method for measuring the displacement of a movable diffraction grating, comprising:

a step for irradiating a first position of the diffraction grating with a first radiation beam, and for irradiating a second position of the diffraction grating with a second radiation beam, the first and second positions being spaced from each other;

a first diffracting step for plurally diffracting a first diffracted beam at the second position, which is generated from the first position by said irradiating step, and for plurally diffracting first and second diffracted beams at the first position, generated from the second position by said irradiating step;

a second diffracting step for diffracting a first re-diffracted beam at the first position, which is generated at the second position by said first diffracting step, and for diffracting a second re-diffracted beam at the second position, which is generated at the first position by said first diffracting step;

a forming step for forming an interference beam by interfering a diffracted beam which is generated by diffracting the first re-diffracted beam at the first position and a diffracting beam which is generated by diffracting the second re-diffracted beam at the second position with each other; and a measuring step for measuring the displacement of the diffraction grating by detecting of the interference beam.

30. A method according to claim 29, wherein the first diffracted beam comprises a +1-order diffracted beam and the second diffracted beam comprises a −1-order diffracted beam, and said first diffracting step comprises a step for plurally converting the first diffracted beam to a +1-order diffracted beam by diffraction and for plurally converting the second diffracted beam to a +1-order diffracted beam by diffraction, and wherein the first re-diffracted beam is generated as a +1-order diffracted beam and the second re-diffracted beam is generated as a −1-order diffracted beam by said converting steps, and wherein the diffracted beam generated by diffracting the first re-diffracted beam comprises a +1-order diffracted beam and the diffracted beam generated by diffracting the second re-diffracted beam comprises a −1-order diffracted beam.

* * * * *

UNITED STATES PATENT AND TRADEMARK OFFICE
CERTIFICATE OF CORRECTION

PATENT NO. : 4,970,388

DATED : November 13, 1990

INVENTOR(S) : TETSUHARU NISHIMURA ET AL.

It is certified that error appears in the above-identified patent and that said Letters Patent is hereby corrected as shown below:

COLUMN 2

Line 13, "is$\frac{1}{4}$" should read --is $\frac{1}{4}$--.

COLUMN 4

Line 21, "diffracted" should read --diffracted light--.
Line 32, "diffraction grating" should read --diffraction grating 3--.

COLUMN 6

Line 61, close up right margin.
Line 62, close up left margin.

COLUMN 8

Line 38, "twice" should read --two--.
Line 42, "twice" should read --two--.

COLUMN 9

Line 42, "grating, and" should read --grating and reflecting and diffracting the first reflected and re-diffracted beam directed into the diffraction grating, and--.
Line 43, "direction" should read --directing--.
Line 44, "rediffracted" should read --re-diffracted--.

UNITED STATES PATENT AND TRADEMARK OFFICE
CERTIFICATE OF CORRECTION

PATENT NO. : 4,970,388

DATED : November 13, 1990

INVENTOR(S) : TETSUHARU NISHIMURA ET AL.

It is certified that error appears in the above-identified patent and that said Letters Patent is hereby corrected as shown below:

COLUMN 10

Line 30, "sat" should read --at--.
    Line 40, "+m-order" should read ---m-order-- and "-m-order" should read --+m-order--.

COLUMN 11

Line 65, "to said" (second occurrence) should be deleted.

COLUMN 12

Line 35, "mean" should read --means--.

COLUMN 13

Line 19, "+1-order" should read ---1-order--.

UNITED STATES PATENT AND TRADEMARK OFFICE
CERTIFICATE OF CORRECTION

PATENT NO. : 4,970,388

DATED : November 13, 1990

INVENTOR(S) : TETSUHARU NISHIMURA ET AL.

It is certified that error appears in the above-identified patent and that said Letters Patent is hereby corrected as shown below:

COLUMN 14

```
Line 14, "detecting of" should read --detecting--.
Line 16, "claim 29," should read --claim 21,--.
Line 23, "+1-order" should read ---1-order--.
```

Signed and Sealed this

Fifteenth Day of September, 1992

Attest:

DOUGLAS B. COMER

*Attesting Officer*          *Acting Commissioner of Patents and Trademarks*